(12) United States Patent
Hirschmann et al.

(10) Patent No.: US 6,613,401 B2
(45) Date of Patent: Sep. 2, 2003

(54) LIQUID-CRYSTALLINE MEDIUM

(75) Inventors: Harald Hirschmann, Darmstadt (DE); Sven Schüpfer, Aschaffenburg (DE); Renate Graulich, Riedstadt (DE); Martina Weidner, Munster (DE)

(73) Assignee: Merck Patent GmbH, Darmstadt (DE)

( * ) Notice: Subject to any disclaimer, the term of this patent is extended or adjusted under 35 U.S.C. 154(b) by 49 days.

(21) Appl. No.: 10/003,262

(22) Filed: Dec. 6, 2001

(65) Prior Publication Data

US 2002/0119262 A1 Aug. 29, 2002

(30) Foreign Application Priority Data

Dec. 7, 2000 (DE) .......................................... 100 60 745

(51) Int. Cl.[7] ........................ C09K 19/30; C09K 19/12; C09K 19/34; C09K 19/20
(52) U.S. Cl. .............. 428/1.1; 252/299.61; 252/299.63; 252/299.66; 252/299.67
(58) Field of Search ...................... 252/299.61, 299.63, 252/299.66, 299.67; 428/1.1

(56) References Cited

U.S. PATENT DOCUMENTS

| | | | | |
|---|---|---|---|---|
| 5,679,285 A | * | 10/1997 | Bartmann et al. | 252/299.63 |
| 5,744,058 A | * | 4/1998 | Reiffenrath et al. | 252/299.61 |
| 6,017,469 A | * | 1/2000 | Reiffenrath et al. | 252/299.63 |
| 6,254,941 B1 | * | 7/2001 | Kondou et al. | 428/1.1 |

* cited by examiner

*Primary Examiner*—Shean C. Wu
(74) *Attorney, Agent, or Firm*—Millen, White, Zelano & Branigan, P.C.

(57) ABSTRACT

Liquid-crystalline media comprising one or more compounds of formula A

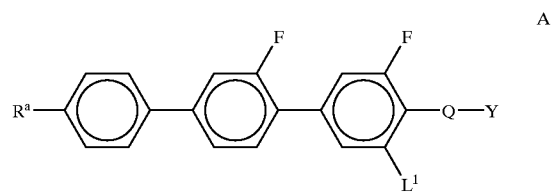

and at least one compound of formula B

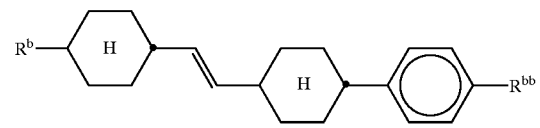

are suitable for use in TN and STN displays.

20 Claims, No Drawings

LIQUID-CRYSTALLINE MEDIUM

The invention relates to a liquid-crystalline medium and to twisted nematic (TN) and supertwisted nematic (STN) liquid crystal displays having very short switching times and good steepness and angular dependence and to the novel nematic liquid crystal mixtures employed therein.

TN displays are known, e.g. from M. Schadt and W. Helfrich, Appl. Phys. Lett., 18, 127 (1971). STN displays are known, e.g. from EP 0 131 216 B1; DE 34 23 993 A1; EP 0 098 070 A2; M. Schadt and F. Leenhouts, 17$^{th}$ Freiburg Conference on Liquid Crystals (Aug.–Nov. 4, 1987); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987), and E. P. Raynes, Mol. Cryst. Liq. Cryst. Letters Vol. 4 (1), pp. 1–8 (1986). The term STN herein comprises any relatively strongly twisted display element having a twist angle amounting to between 160° and 360°, for example the display elements according to Waters et al. (C. M. Waters et al., Proc. Soc. Inf. Disp. (New York) (1985) (3$^{rd}$ Intern. Display Conference, Kobe, Japan), the STN LCDs (DE-A-35 03 259), SBE LCDs (T. J. Scheffer and J. Nehring, Appl. Phys. Lett. 45 (1984) 1021), OMI LCDs (M. Schadt and F. Leenhouts, Appl. Phys. Lett. 50 (1987), 236, DST LCDs (EP-A 0 246 842) or BW STN LCDs (K. Kawasaki et al., SID 87 Digest 391 (20.6)).

STN displays in particular are distinguished, compared with standard TN displays, by considerably better slopes of the electro-optical characteristic curve and the attendant better contrast values and by a significantly reduced angular dependence of the contrast.

Of interest are TN and STN displays having a very short switching time, especially at lower temperatures. To achieve short switching times it has hitherto been the practice to optimize the rotational viscosities of the liquid crystal mixtures by employing usually monotropic additives having a relatively high vapor pressure. The switching times achieved were not, however, adequate for all applications.

To achieve a steep electro-optical characteristic curve in the displays according to the invention, the liquid crystal mixtures should have relatively large values of $K_{33}/K_{11}$ and relatively small values of $\Delta\epsilon/\epsilon_\perp$, $\Delta\epsilon$ being the dielectric anisotropy and $\epsilon_\perp$ being the dielectric constant perpendicular to the longitudinal axis of the molecules.

Beyond optimized contrast and optimized switching times, such mixtures are subject to further important requirements:

1. wide d/p window
2. high chemical long-term stability
3. high electrical resistance
4. low frequency dependence and temperature dependence of the threshold voltage.

The parameter combinations achieved are still inadequate by a long shot, especially for high-multiplex STN displays (with a multiplex rate in the range of about 1/400), but also for low- and medium-multiplex STN displays (with multiplex rates in the range of from about 1/64 and 1/16, respectively), and TN displays. One reason for this is that the effects of material parameters on the various requirements pull in opposite directions.

There is therefore still a great need for TN and STN displays, especially for low- and medium-multiplex STN displays, having very short switching times in conjunction with a wide operating temperature range, a steep characteristic curve, good angular dependence of contrast and low threshold voltage, which comply with the above-specified requirements.

SUMMARY OF THE INVENTION

An object of the invention is to provide liquid-crystalline media, especially for TN and STN displays, which do not have the above-specified drawbacks or which have them only to a lesser extent and at the same time have short switching times, in particular at low temperatures, and have very good steepness.

Upon further study of the specification and appended claims, further objects and advantages of this invention will become apparent to those skilled in the art.

These objects can be achieved by employing liquid-crystal mixtures which comprise one or more compounds of formula A

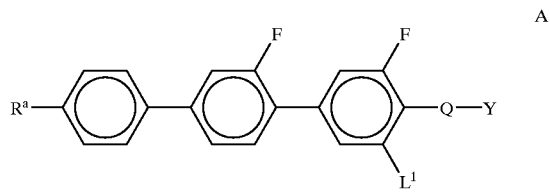

and at least one compound of formula B

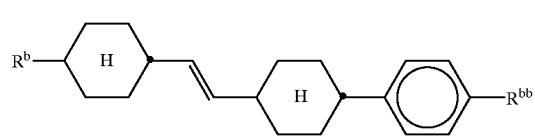

where $R^a$, $R^b$ and $R^{bb}$ are each, independently, an alkyl radical having 1 to 12 C atoms which is unsubstituted, singly substituted by CN or CF$_3$ or at least singly substituted by halogen, with the additional option of one or more CH$_2$ groups in the radicals, independently of one another in each case, being replaced by —O—, —S—,

—CH=CH—, —C≡C—, —CO—, —CO—O—, —O—CO— or —C—CO—C— in such a way that O atoms are not directly linked together, L$^1$ is H or F, Q is CF$_2$, OCF$_2$, CFH, OCFH or a single bond Y is F or Cl, and Q—Y alternatively also is NCS, SCN, OCHFCF$_3$ or SF$_5$.

The use of the compounds of formulae A and B in mixtures for TN and STN displays according to the invention results in a steeply sloping electro-optical characteristic curve, a low temperature dependence of the threshold voltage, and very rapid switching times, especially at low temperatures.

The compounds of formula A and B, in particular, distinctly shorten the switching times of TN and STN mixtures, while at the same time result in an increase in the steepness and a low temperature dependence of the threshold voltage.

The mixtures according to the invention are further distinguished by the following advantages:

they have low viscosity, they have a low threshold voltage and operating voltage, they result in long storage times in the display at low temperatures.

The invention further relates to a liquid crystal display comprising two substrates which, together with an edging, form a cell, contained in the cell, a nematic liquid crystal mixture having positive dielectric anisotropy, electrode layers having alignment layers on the insides of the substrates, a pre-tilt angle between the longitudinal axis of the molecules at the surface of the substrates and the substrates of from 0 to 30 degrees, and a twist angle of the liquid crystal mixture in the cell which, from alignment layer to alignment layer, is 22.5° to 600°, a nematic liquid crystal mixture comprising

--- a) 15–75 wt % of a liquid-crystalline component A, containing one or more compounds having a dielectric anisotropy of more than +1.5;
b) 25–85 wt % of a liquid-crystalline component B, containing one or more compounds having a dielectric anisotropy of −1.5 to +1.5;
c) 0–20 wt % of a liquid-crystalline component D, containing one or more compounds having a dielectric anisotropy of less than −1.5, and
d) optionally an optically active component C in such an amount that the ratio between layer thickness (spaqing of the substrates) and natural pitch of the chiral nematic liquid crystal mixture is about 0.2 to 1.3,

--- characterized in that component A comprises at least one compound of formula A,

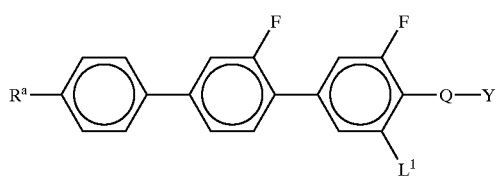

A and component B comprises at least one compound of formula B

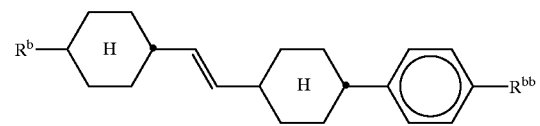

B where where $R^a$, $R^b$, $R^{bb}$, $L^1$ and Q-Y have the meanings specified previously.

The invention also relates to TN and STN displays, especially in medium- and low-multiplexed STN displays, which contain the liquid-crystal mixture according to the invention.

In particular, formula A comprises compounds of the subformulae A-1 to A-8,

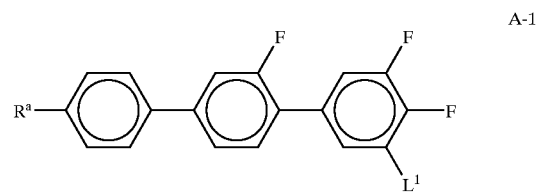

A-1

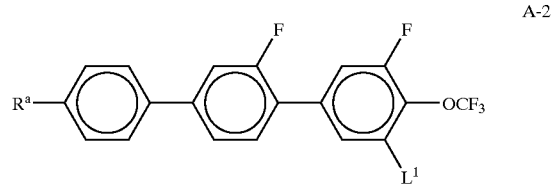

A-2

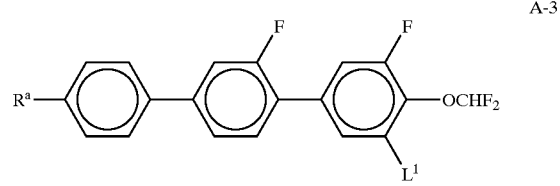

A-3

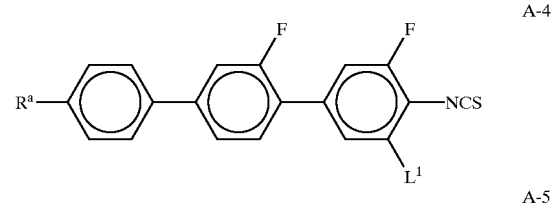

A-4

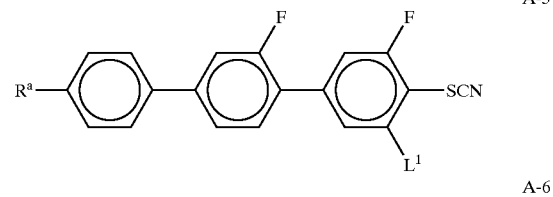

A-5

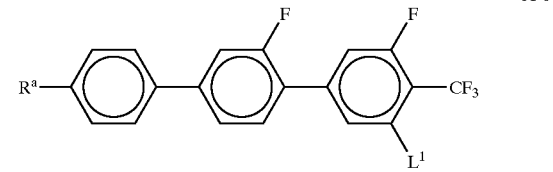

A-6

-continued

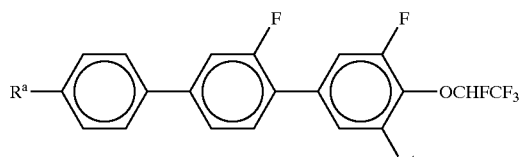
A-7

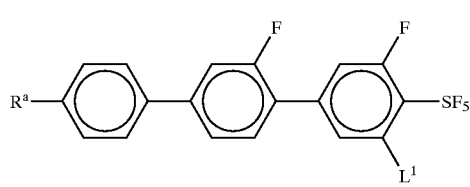
A-8 where $R^a$ and $L^1$ have the meanings specified previously.

Preferred are mixtures according to the invention which comprise at least one compound of formula A-1 and/or A-2, more preferably at least one compound of formula A-1 where $L^1$=F.

In the formulae A and A-1 to A-8, $R^a$ preferably is straight-chain alkyl or alkoxy, or 1E-alkenyl or 3E-alkenyl having 2 to 7 C atoms.

Formula B comprises compounds of the subformulae B-1 to B-5,

B-1 alkyl—H—H—alkyl*

B-2 alkyl—H—H—O-alkyl

B-3 alkenyl—H—H—alkyl

B-4 alkenyl—H—H—alkenyl*

B-5 alkenyl—H—H—O-alkyl where alkyl or alkyl* each, independently of one another, is a straight-chain or branched alkyl radical having from 1 to 12 C atoms, and alkenyl or alkenyl* each, independently of one another, is a straight-chain or aranched alkenyl radical having from 2 to 12 C atoms.

Preferably, the radicals "alkyl" or "alkyl*" and "alkenyl" or "alkenyl*" are straight-chain and have up to 7 C atoms.

The use of the compounds of formulae A and B in the liquid-crystal mixtures according to the invention results in particularly low values for the rotational viscosity in TN and STN displays having high steepness and rapid switching times, especially at low temperatures.

Component A and the liquid-crystalline mixture according to the invention, in addition to the compounds of formula A, preferably contain one or more 3,4,5-trifluorphenyl compounds selected from the compounds of the formulae IIa to IIk,

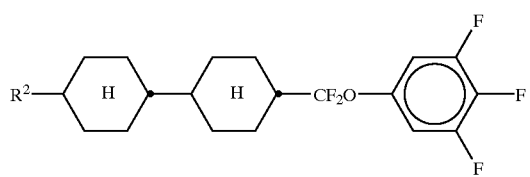
IIa

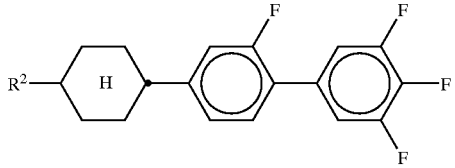
IIb

IIc

IId

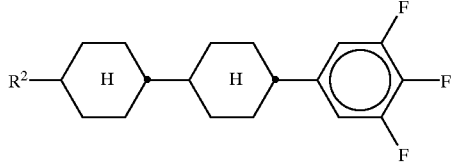
IIe

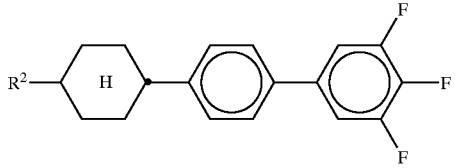
IIf

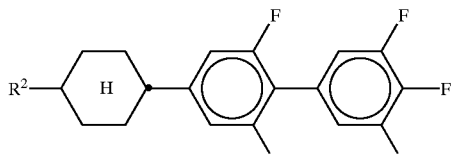

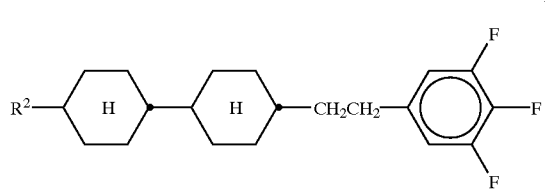
IIg

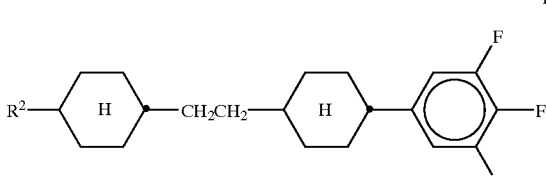
IIh

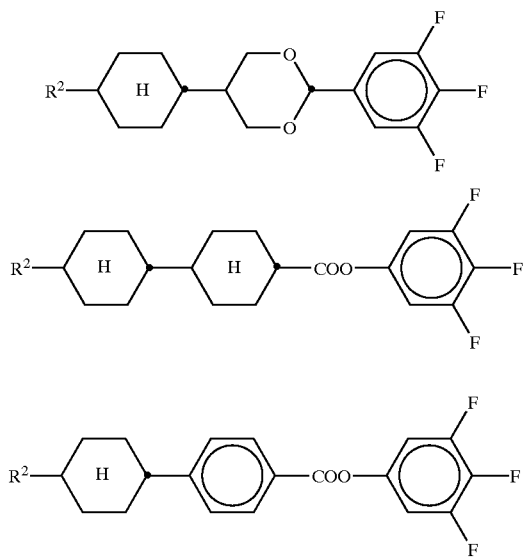
In addition to the compounds of formulae A and B, the medium according to the invention can also contain one or more compounds having a polar terminal group of the formulae II*a to II*s,
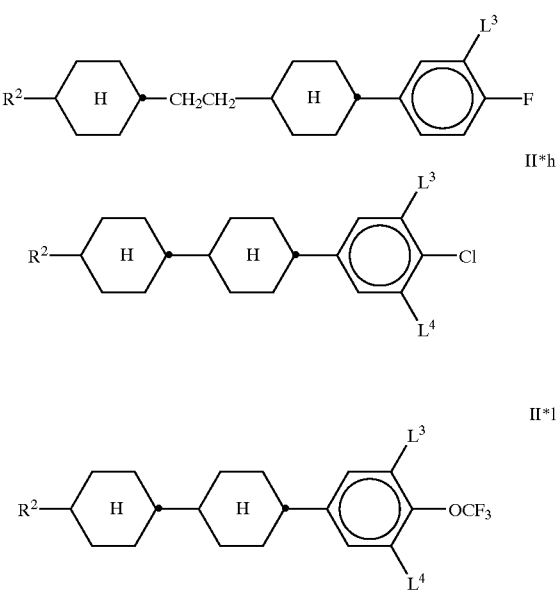
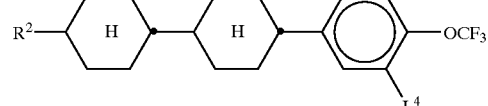
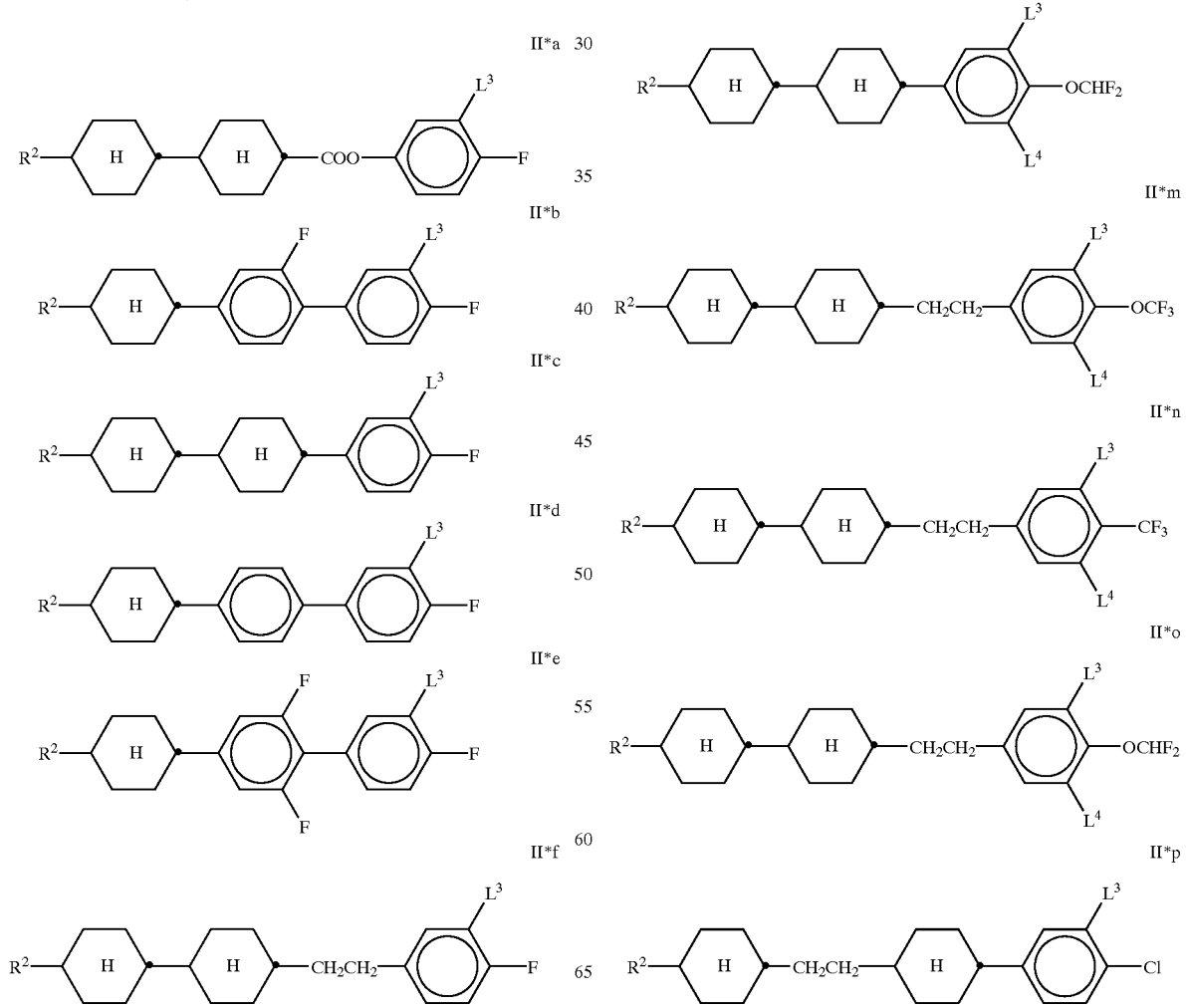

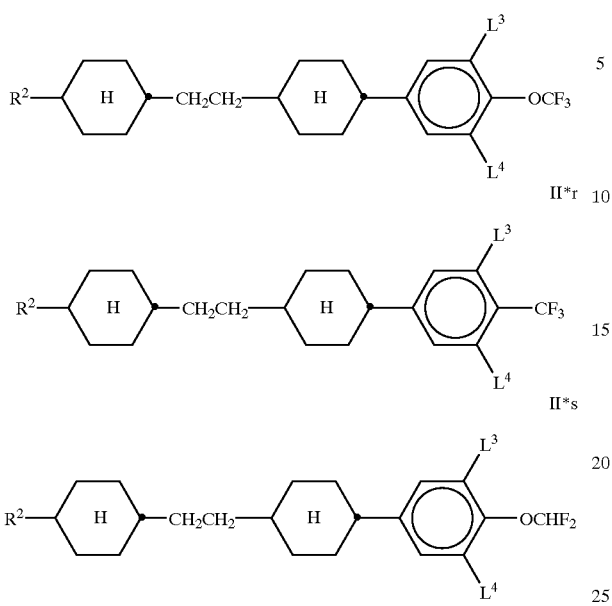

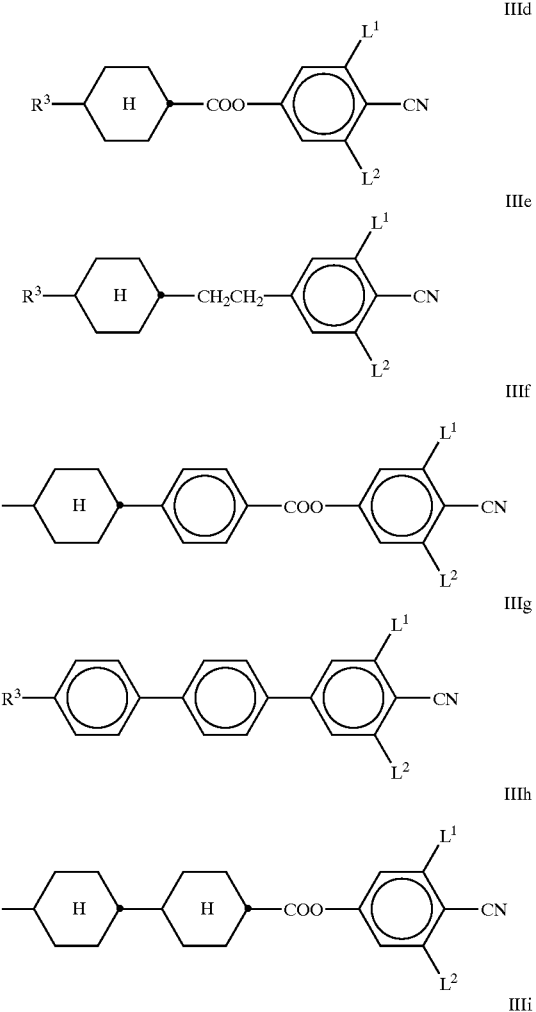

where $R^2$ in formulae IIa–IIk and $II^*_a$–$II^*_s$ has one of the meanings specified for $R^a$, and $L^3$ and $L^4$ each, independently of one another, is H or F. $R^2$ in these compounds is preferably alkyl, alkenyl or alkoxy having up to 7 C atoms.

Preferably, the medium according to the invention or component A comprises compounds of the formulae IIa, IIb, IIc, IId, IIe, IIf, IIg, IIj, $II^*b$, $II^*c$, $II^*d$, $II^*f$ and/or $II^*i$, more preferably one or more compounds of the formulae IIa, IIb, IId, IIi, $II^*a$ and $II^*i$.

The mixture according to the invention preferably contains one or more cyano compounds of the formulae IIIa to IIIj:

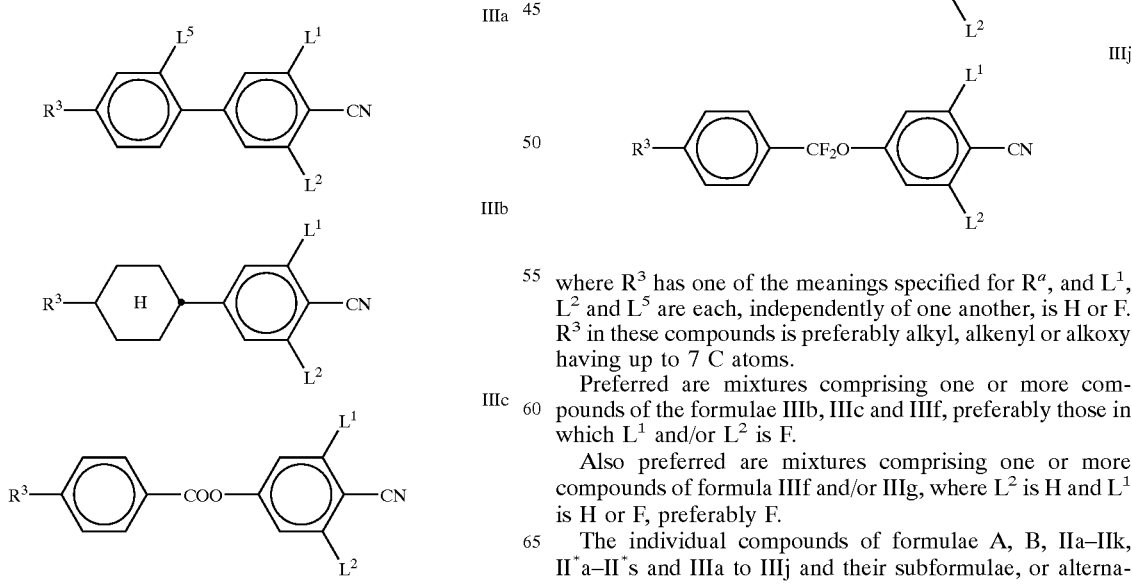

where $R^3$ has one of the meanings specified for $R^a$, and $L^1$, $L^2$ and $L^5$ are each, independently of one another, is H or F. $R^3$ in these compounds is preferably alkyl, alkenyl or alkoxy having up to 7 C atoms.

Preferred are mixtures comprising one or more compounds of the formulae IIIb, IIIc and IIIf, preferably those in which $L^1$ and/or $L^2$ is F.

Also preferred are mixtures comprising one or more compounds of formula IIIf and/or IIIg, where $L^2$ is H and $L^1$ is H or F, preferably F.

The individual compounds of formulae A, B, IIa–IIk, $II^*a$–$II^*s$ and IIIa to IIIj and their subformulae, or alternatively other compounds which can be used in the mixtures according to the invention or in TN and STN displays, are either known or they can be prepared in a manner similar to that for the known compounds.

The compounds of formula A have low viscosities, in particular low rotational viscosities, and low values for the ratio of the elastic constants $K_{33}/K_{11}$ and therefore their presence results in short switching times in the displays according to the invention, while the presence of compounds of formula B have high dielectric anisotropy, particularly at elevated concentrations, resulting in reduced viscosity.

Preferred liquid-crystal mixtures comprise one or more compounds of component A, preferably in a proportion of 15% to 75%, more preferably from 20% to 65%. These compounds have a dielectric anisotropy $\Delta\epsilon \geq +3$, preferably $\Delta\epsilon \geq +8$, more preferably $\Delta\epsilon \geq +12$.

Further preferred mixtures comprise one or more, preferably two to four, compounds of formula A, one, two or three compounds each of the formulae A-1 and A-3, one or more, preferably one or two, compounds of formula B, one or more, preferably two to five, compounds of formula IIIb, IIIc and/or IIIf.

Preferred liquid-crystal mixtures comprise one or more compounds of component B, preferably 25 to 85%. The compounds of group B are distinguished, in particular, by their low values of rotational viscosity $\gamma_1$.

Component B preferably comprises one or more compounds of formula IV,

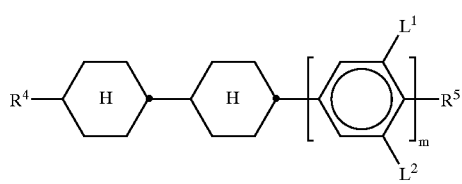

IV where

| | |
|---|---|
| m | is 0 or 1, |
| $R^4$ | is an alkenyl group having 2 to 7 C atoms, |
| $R^5$ | has one of the meanings specified for $R^a$, or when m = 1, it is optionally F, Cl, $CF_3$, or $OCF_3$, |

$L^1$ and $L^2$ each, independently of one another, are H or F.

Preferred compounds of formula IV are those in which $R^4$ is alkenyl having from 2 to 7 C atoms, particularly those of the following formulae

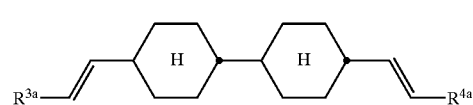

IV1

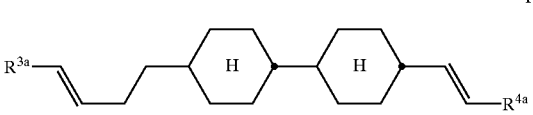

IV2

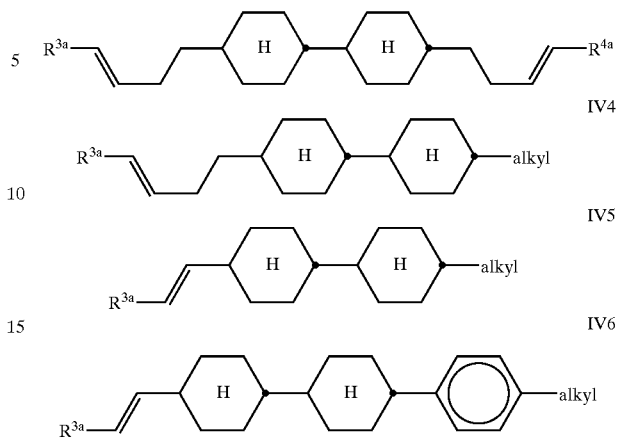

where $R^{3a}$ and $R^{4a}$ each, independently of one another, are H, $CH_3$, $C_2H_5$ or n-$C_3H_7$, and alkyl is an alkyl group having 1 to 7 C atoms.

Preferred are TN and STN displays according to the invention in which the liquid-crystal mixture comprises at least one compound of the formulae IV-1 and/or IV-3 in which $R^{3a}$ and $R^{4a}$ each have the same meaning, and displays in which the liquid-crystal mixture comprises at least one compound of formula IV-5.

In a further preferred embodiment, the mixtures according to the invention comprise one or more compounds of formula IV-6.

Component B preferably further comprises compounds selected from the two-ringed compounds of the formulae V-1 to V-9,

V-1

V-2

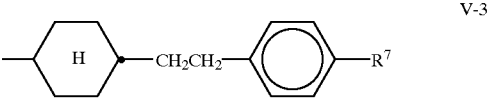

V-3

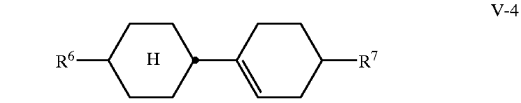

V-4

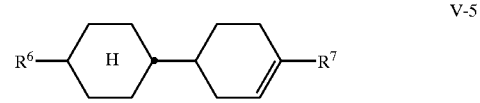

V-5

V-6

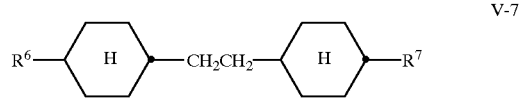

V-7

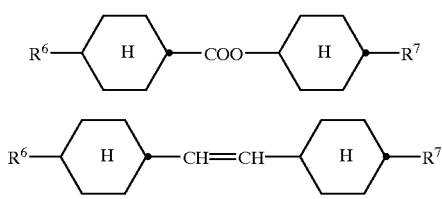
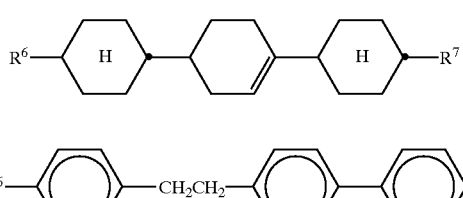
and/or one or more compounds selected from the three-ringed compounds of the formulae V-10 to V-27,
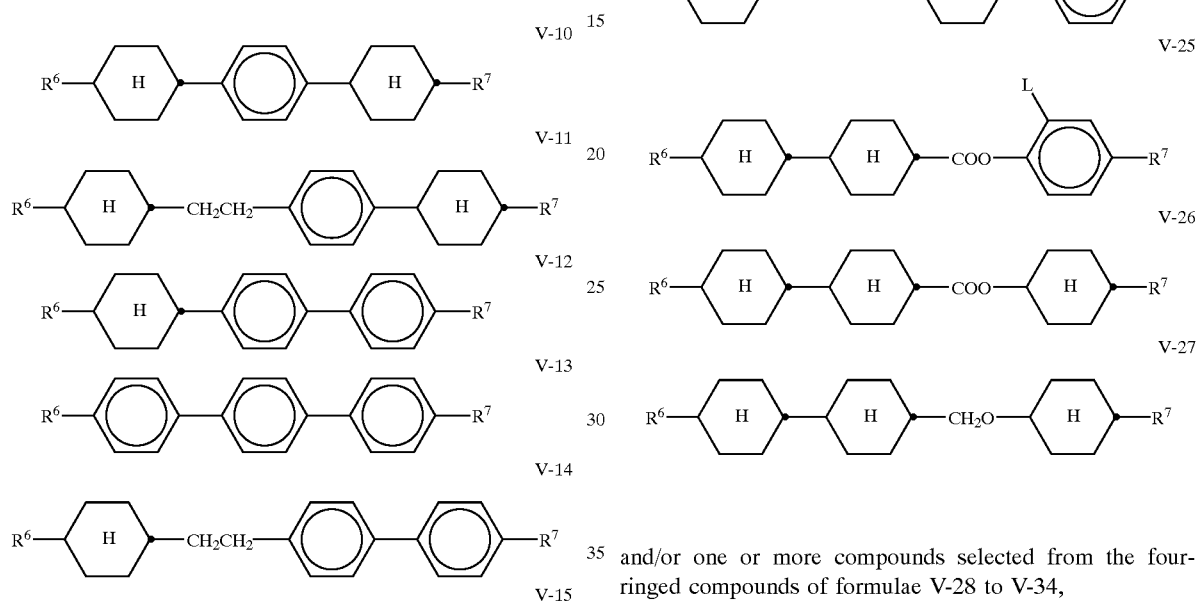
and/or one or more compounds selected from the four-ringed compounds of formulae V-28 to V-34,
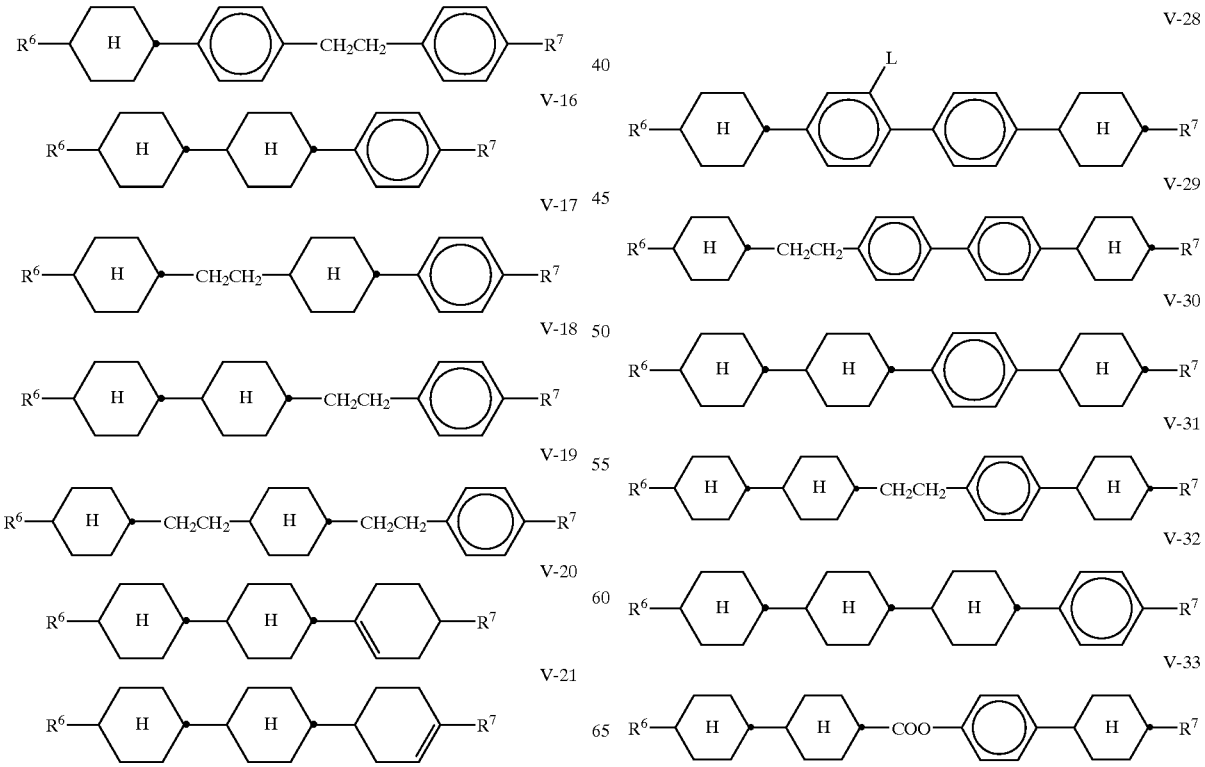

V-34

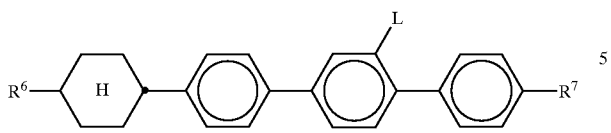

where $R^6$ and $R^7$ have the meanings specified for $R^a$ in formula A, and L is H or F.

Preferred are compounds of the formulae V-25 to V-31, where $R^6$ is alkyl and $R^7$ is alkyl or alkoxy, especially alkoxy, each having from 1 to 7 C atoms. Also preferred are compounds of formula V-25, V-28 and V-34, where L is F.

$R^6$ and $R^7$ in the compounds of formulae V-1 to V-34 preferably are straight-chain alkyl or alkoxy having from 1 to 12 C atoms.

Preferred are mixtures according to the invention which comprise one or more compounds of formula B-3a and/or B-5a.

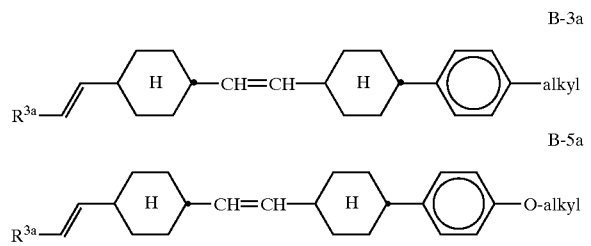

where $R^{3a}$ is H, $CH_3$, $C_2H_5$ or $n\text{-}C_3H_7$ and alkyl is an alkyl group having 1 to 7 C atoms.

Preferably, the mixtures comprise 2–25 wt %, more preferably 2–15 wt % of compounds of formula B-5a.

The liquid-crystalline mixtures optionally comprise an optically active component C in such an amount that the ratio between layer thickness (spacing of the substrates) and natural pitch of the chiral nematic liquid-crystal mixture is greater than 0.2. This component can be selected by those skilled in the art from a multiplicity of chiral dopants, some of which are commercially available, e.g. cholesteryl nonanoate, S-811, S-1011, S-2011 from Merck KGaA, Darmstadt and CB15 (BDH, Poole, UK). The choice of dopants is not critical per se.

The proportion of the compounds of component C is preferably 0 to 10%, more preferably 0 to 5%, and particularly preferably 0 to 3%.

The mixtures according to the invention may also optionally comprise up to 20% of one or more compounds having a dielectric anisotropy of <−2 (component D).

If the mixtures comprise compounds of component D, these are preferably one or more compounds containing the structural element 2,3-difluoro-1,4-phenylene, e.g. compounds according to DE-A-38 07 801, 38 07 861, 38 07 863, 38 07 864 or 38 07 908. Preferred are tolanes containing said structural element according to International Patent Application PCT/DE 88/00133.

Further known compounds for component D are, for example, derivatives of the 2,3-dicyanohydroquinones or cyclohexane derivatives containing the structural element

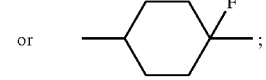

according to DE-A 32 31 707 and DE-A 34 07 013.

Preferably, the liquid crystal displays according to the invention do not comprise any compounds of component D.

The term "alkenyl" in the meaning of $R^a$, $R^b$, $R^{bb}$, $R^2$, $R^3$, $R^4$, $R^5$, $R^6$ and $R^7$ encompasses straight-chain and branched alkenyl groups, especially the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl, and $C_7$-6-alkenyl, especially $C_2$–$C_7$-1E-alkenyl, $C_4$–$C_7$-3E-alkenyl and $C_5$–$C_7$-4-alkenyl.

Examples of preferred alkenyl groups include vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to five carbon atoms are generally preferred.

Further preferred embodiments relate to liquid-crystal mixtures according to the invention which additionally comprise one or more, preferably one, two or three, heterocyclic compounds of formula Va and/or Vb,

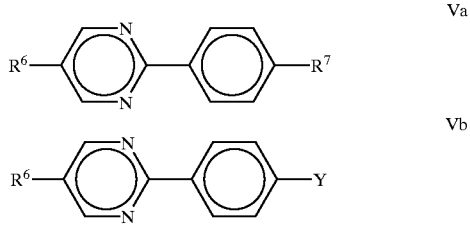

where $R^6$ and $R^7$ have the above-specified meanings and

Y is F or Cl,
  have the proportion of the compounds from Va and/or Vb of preferably 2 to 35%, more preferably 5 to 20%, additionally comprise one or more, preferably one, two or three, tolane compounds of the formulae T2a, T2b and/or T2c,

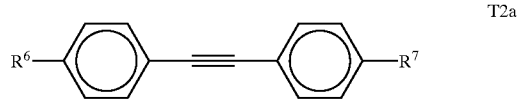

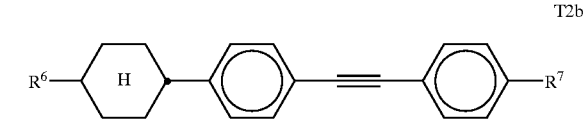

-continued

T2c

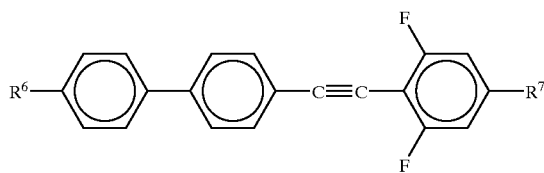

where $R^6$ and $R^7$ have the above-specified meanings.

The proportion of the compounds of T2a, T2b and/or T2c is preferably 2 to 20%, more preferably 4 to 12%. Preferably, the mixture according to the invention comprises two or three compounds of the formulae T2a and/or T2b.

In preferred embodiments, the mixtures comprise at least a compound of formula A-1

A-1

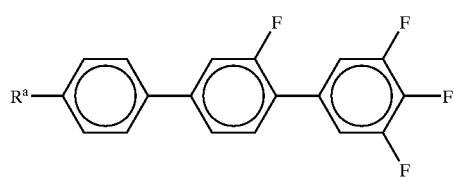

at least one compound of formula IIb

IIb

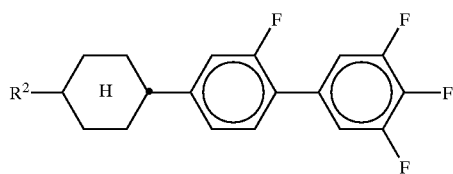

at least one compound of formula IIj;
at least one tolane compound of formula T2c;
at least two, especially three compounds of formula A;
at least two, especially three compounds of formula B;
at least one compound of formula T2a;
at least one compound of formula T2b;
at least one compound of the following formula,

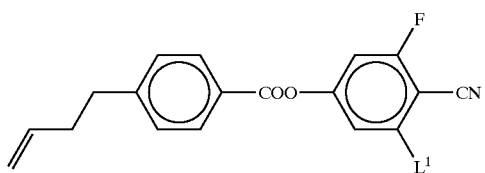

where $L^1$ is H or F;
at least 2.5 wt % of one or more compounds of formula IV-5;
5–30 wt %, preferably 10–25 wt %, of one or more compounds of formula A;
5–30 wt %, preferably 5–20 wt %, of one or more compounds of formula B; and
at least three homologues of the compounds of formula A, where $R^a$ preferably is $C_2H_5$, n-$C_3H_7$ or n-$C_5H_{11}$.

Preferred homologues of the compounds of formula A are:

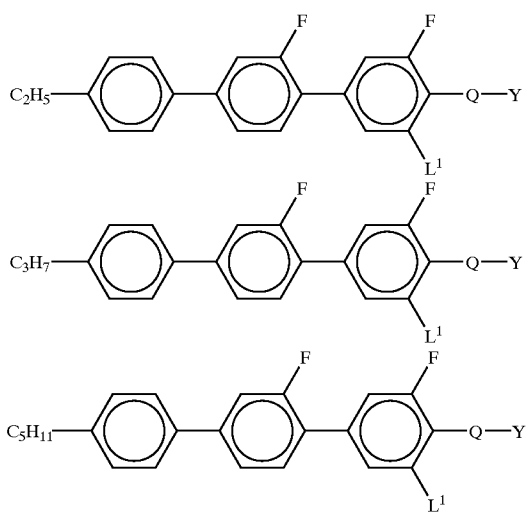

Further preferred embodiments relate to liquid crystal mixtures which comprise a total of three to six compounds of formulae A and B, the proportion of these compounds in the overall mixture is 25 to 65%, in particular 30 to 55%, comprise more than 20% of compounds having a dielectric anisotropy $\Delta\epsilon \geq +12$.

The mixtures according to the invention are distinguished, particularly when used in TN and STN displays having high layer thicknesses, by very low total switching times ($t_{ges} = t_{on} + t_{off}$).

The liquid crystal mixtures used in the STN and TN cells according to the invention are dielectrically positive with $\Delta\epsilon \geq 1$. Preferred are liquid crystal mixtures having $\Delta\epsilon \geq 3$, particularly those having $\Delta\epsilon \geq 5$.

The liquid crystal mixtures according to the invention exhibit useful values for the threshold voltage $V_{10/0/20}$ and for the rotational viscosity $\gamma_1$. If the optical path difference d·$\Delta$n has a predetermined value, the value of the layer thickness d is defined by the optical anisotropy $\Delta$n. Particularly for relatively high values of d·$\Delta$n, the use of liquid crystal mixtures according to the invention having a relatively high value of the optical anisotropy is preferred, since a relatively small value of d can then be chosen, leading to more favorable values for switching times. However, even those liquid crystal displays according to the invention which comprise liquid crystal mixtures according to the invention having smaller values for An are characterized by advantageous values for switching times.

The liquid crystal mixtures according to the invention are further characterized by advantageous values of the slope of the electro-optical characteristic curve and can be operated at high multiplex rates, especially at temperatures above 20° C. Moreover, the liquid crystal mixtures according to the invention exhibit high stability and favorable values for electrical resistance and the threshold voltage frequency dependence. The liquid crystal displays according to the invention have a wide operating temperature range and good angular dependence of contrast.

The configuration of the liquid crystal display elements according to the invention, comprising polarizers, electrode baseplates and electrodes surface-treated in such a way that the preferential alignment (director) of the liquid crystal molecules adjoining each of these is usually twisted with respect to one another by an amount of 160° to 720° from one electrode to the other, which corresponds to the design customary for such display elements. In this context, the term "customary design" is to be interpreted broadly and also encompasses all alterations and modifications of the TN and STN cell, including matrix display elements, and display elements comprising additional magnets.

The surface tilt angle at the two substrates can be identical or different. Identical tilt angles are preferred. Preferred TN displays have pre-tilt angles between the longitudinal axis of the molecules at the surface of the substrates and the substrates of 0° to 7°, preferably 0.01° to 5°, and more preferably 0.1 to 2°. In the STN displays the pre-tilt angle is preferably 1° to 30°, more preferably 1° to 12° and especially 3° to 10°.

The twist angle of the TN mixture in the cell is 22.5° to 170°, preferably 45° to 130° and more preferably 80° to 115°. In the cell, the twist angle of the STN mixture, from alignment layer to alignment layer, is preferably 100° to 600°, more preferably 170° to 300°, and especially 180° to 270°.

The preparation of the liquid crystal mixtures according to the invention is performed in a manner customary per se. As a guide, the desired quantity of the components used in a smaller amount is dissolved in the components constituting the main constituent, expediently at elevated temperature. Alternatively it is possible to mix solutions of the components in an organic solvent, e.g. in acetone, chloroform or methanol, and to remove the solvent again after thorough mixing, for example by distillation.

The dielectrics may further comprise additives known to those skilled in the art and described in the literature. For example, 0–15% of pleochroitic dyes can be added.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below, and of corresponding German application No. 10060745.4, filed Dec. 7, 2000 is hereby incorporated by reference.

In the present application and in the following examples, the structures of the liquid crystal compounds are given as acronyms, the transformation into chemical formulae being defined by tables A and B. All the radicals $C_nH_{2n+1}$ and $C_mH_{2m+1}$ are straight-chain alkyl radicals having n or m C atoms. The alkenyl radicals are in the trans configuration. Coding according to table B is self-explanatory. Table A only lists the acronym for the parent structure.

In individual cases, the parent structure acronym is followed, separated therefrom by a dash, by a code, given in the table below, for the substituents $R^{1*}$, $R^{2*}$, $L^{2*}$, $L^{2*}$ and $L^{3*}$.

The TN and STN displays preferably comprise liquid-crystalline mixtures which are composed of one or more compounds from tables A and B.

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ | $L^{3*}$ |
|---|---|---|---|---|---|
| Nm | $C_nH_{2n+1}$ | $C_mH_{2m+1}$ | H | H | H |
| NOm | $OC_nH_{2n+1}$ | $C_mH_{2m+1}$ | H | H | H |
| nO.m | $C_nH_{2n+1}$ | $OC_mH_{2m+1}$ | H | H | H |
| N | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| NF | $C_nH_{2n+1}$ | F | H | H | H |
| NOF | $OC_nH_{2n+1}$ | F | H | H | H |
| nF.F | $C_nH_{2n+1}$ | F | H | H | F |
| NmF | $C_nH_{2n+1}$ | $C_mH_{2m+1}$ | F | H | H |
| $nOCF_3$ | $C_nH_{2n+1}$ | $OCF_3$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

TABLE A ($L^{1*}$, $L^{2*}$, $L^{3*}$ = H or F)

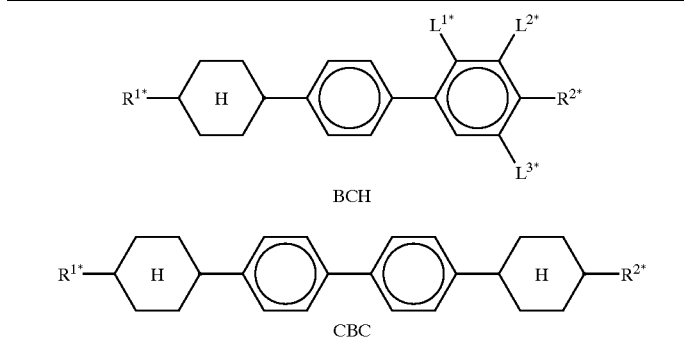

BCH

CBC

TABLE A-continued
($L^{1*}, L^{2*}, L^{3*}$ = H or F)
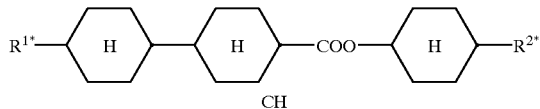
CH
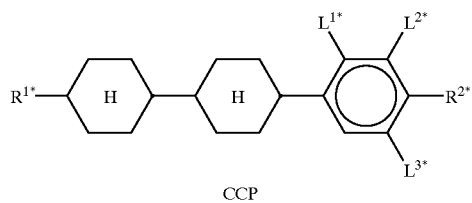
CCP
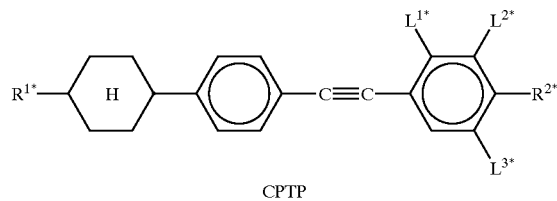
CPTP
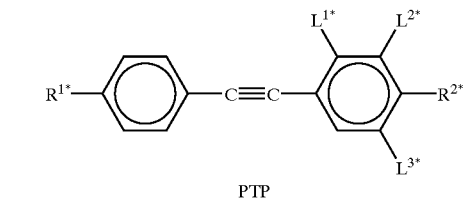
PTP
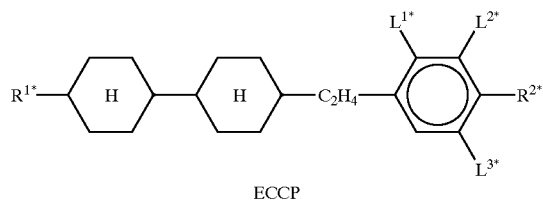
ECCP
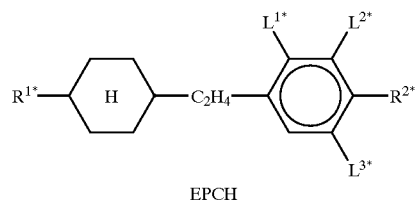
EPCH
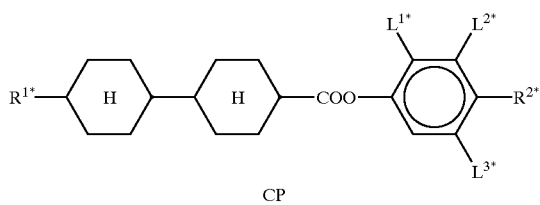
CP TABLE A-continued ($L^{1*}$, $L^{2*}$, $L^{3*}$ = H or F)

[Structure: $R^{1*}$—phenyl—COO—phenyl($L^{1*}$, $L^{2*}$, $L^{3*}$)—$R^{2*}$]

ME

[Structure: $R^{1*}$—H (cyclohexyl)—phenyl—COO—phenyl($L^{1*}$, $L^{2*}$, $L^{3*}$)—$R^{2*}$]

HP

[Structure: $R^{1*}$—H—phenyl($L^{1*}$, $L^{2*}$, $L^{3*}$)—$R^{2*}$]

PCH

[Structure: $R^{1*}$—H—H—COO—phenyl—H—$R^{2*}$]

CCPC

[Structure: $R^{1*}$—H—H—$R^{2*}$]

CCH

TABLE B

[Structure: $C_nH_{2n+1}$—H—phenyl(F)—phenyl—H—$C_mH_{2m+1}$]

CBC-nmF

[Structure: $C_nH_{2n+1}$—H—H—COO—phenyl(F)—$C_mH_{2m+1}$]

CP-nmF

[Structure: $C_nH_{2n+1}$—H—H—COO—phenyl(F,F,F)]

CCZU-n-F

TABLE B-continued
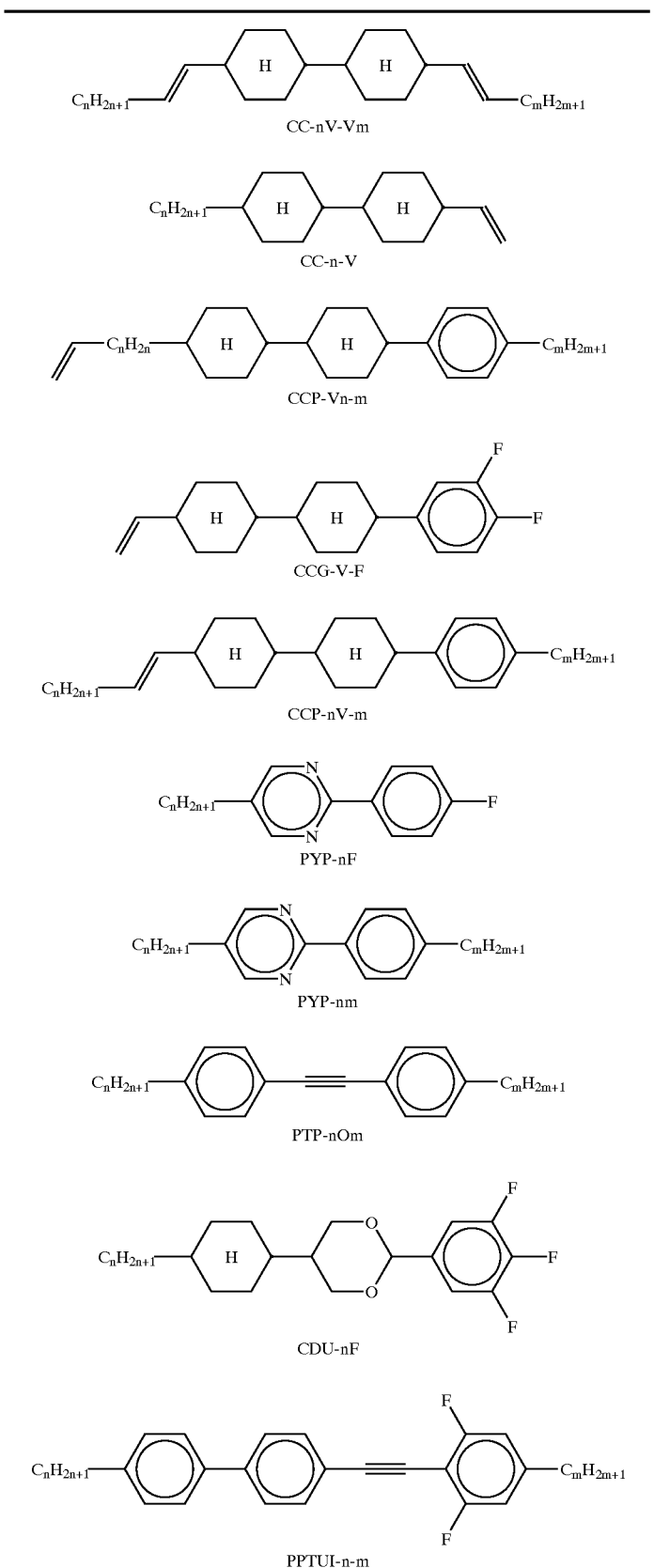

TABLE B-continued
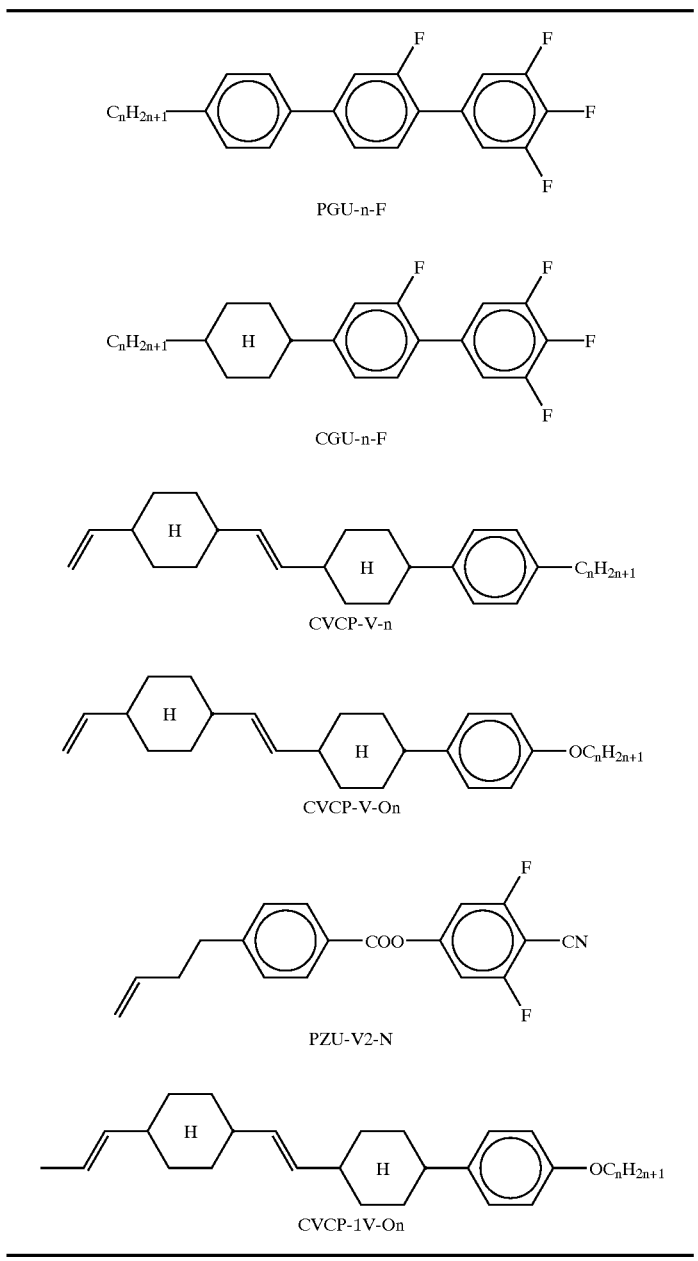
PGU-n-F
CGU-n-F
CVCP-V-n
CVCP-V-On
PZU-V2-N
CVCP-1V-On
TABLE C
Table C lists dopants which are customarily used in the mixtures according to the invention
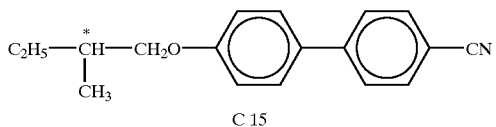
C 15
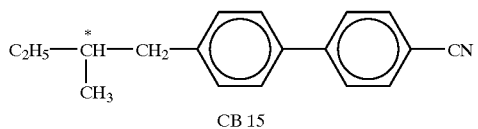
CB 15

TABLE C-continued
Table C lists dopants which are customarily used in the mixtures according to the invention
CM 21
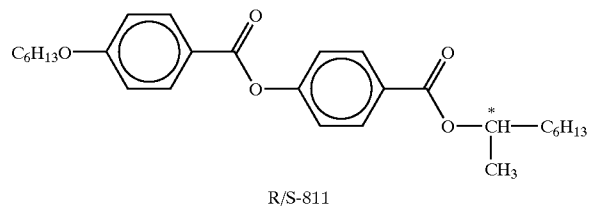
R/S-811
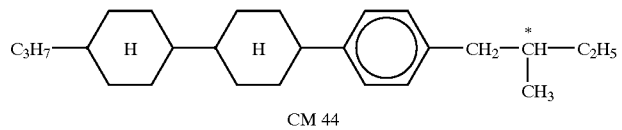
CM 44
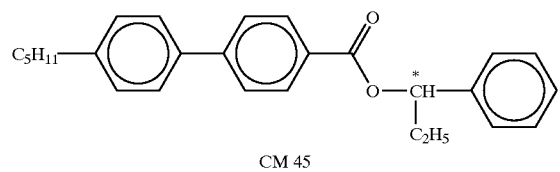
CM 45
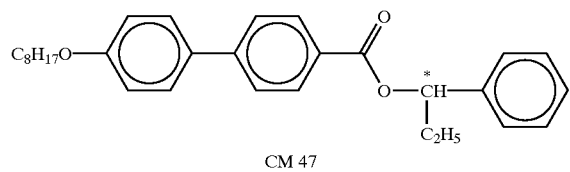
CM 47
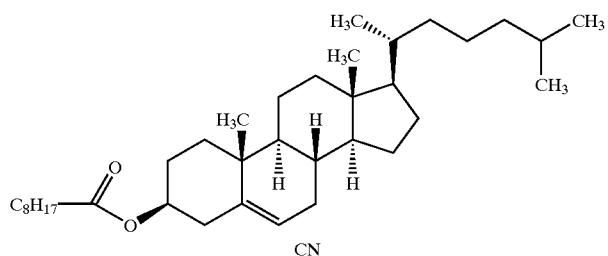
CN
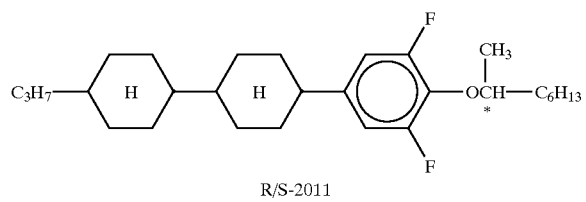
R/S-2011

TABLE C-continued

Table C lists dopants which are customarily used in the mixtures according to the invention

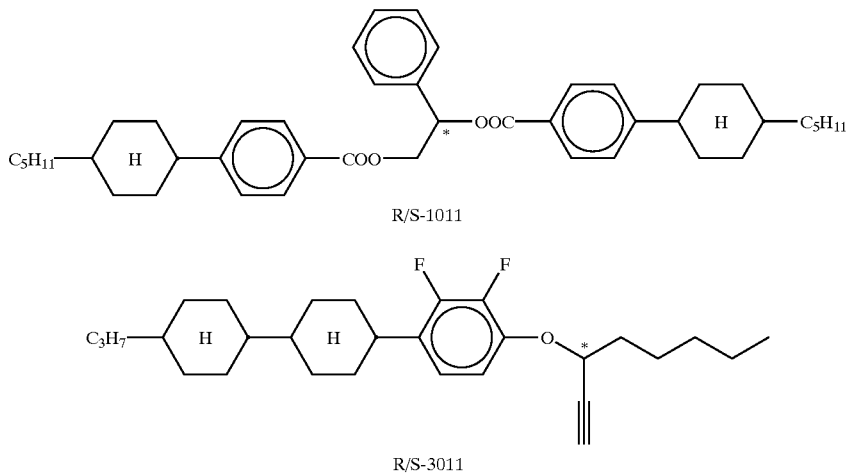

R/S-1011

R/S-3011

The following examples are intended to illustrate the invention without limiting it. The meaning of the symbols is as follows:

| | |
|---|---|
| KIp. | Clearing point (phase transition temperature nematic-isotropic), |
| S-N | phase transition temperature smectic-nematic, |
| Visk. | flow viscosity (mm$^2$/s, unless specified otherwise, at 20° C.), |
| Δn | optical anisotropy (589 nm, 20° C.), |
| Δε | dielectric anisotropy (1 kHz, 20° C.) |
| γ$_1$ | rotational viscosity (mPa · s at 20° C.) |
| steep | steepness of characteristic curve = $(V_{90}/V_{10} - 1) \cdot 100$ [%] |
| V$_{10}$ | threshold voltage = characteristic voltage at a relative contrast of 10%, |
| V$_{90}$ | characteristic voltage at a relative contrast of 90%, |
| t$_{ave}$ | $\frac{t_{on} + t_{off}}{2}$ (mean switching time), |
| t$_{on}$ | time elapsed between switching on and reaching 90% of the maximum contrast, |
| t$_{off}$ | time elapsed between switching off and reaching 10% of the maximum contrast, |
| Mux | multiplex rate, |
| t$_{store}$ | low-temperature storage stability in hours (−20° C., −30° C., −40° C.) |

Hereinabove and hereinafter, all temperatures are given in °C. Percentages are percent by weight. All values relate to 20° C., unless specified otherwise. Unless specified otherwise, the displays are driven in non-multiplex mode. The twist is 90°, unless specified otherwise.

EXAMPLE 1

| | | | |
|---|---|---|---|
| CGU-2-F | 8.0% | S→N [° C.]: | <−40 |
| CGU-3-F | 7.0% | Clearing point [° C.]: | 97.5 |
| CCP-3F.F.F | 5.0% | Δn [589 nm, 20° C.]: | 0.1640 |
| CCP-V-1 | 8.0% | HTP [1/μm; 20° C.]: | −11.66 |
| CCG-V-F | 10.0% | Twist [°]: | 180 |
| PCH-302 | 8.0% | V$_{10}$ [V]: | 1.84 |
| CVCP-V-1 | 5.0% | Steepness [%]: | 8.3 |
| CVCP-V-01 | 5.0% | | |
| CVCP-1V-01 | 5.0% | | |
| PGU-2-F | 8.0% | | |
| PGU-3-F | 8.0% | | |
| PGU-5-F | 8.0% | | |
| PTP-102 | 5.0% | | |
| PTP-201 | 3.0% | | |
| CPTP-301 | 4.0% | | |
| CPTP-302 | 3.0% | | |

EXAMPLE 2

| | | | |
|---|---|---|---|
| CGU-2-F | 7.0% | S→N [° C.]: | <−40 |
| CGU-3-F | 6.0% | Clearing point [° C.]: | 98.5 |
| CCP-V-1 | 6.0% | Δn [589 nm, 20° C.]: | 0.1628 |
| CCG-V-F | 14.0% | Δε [1 kHz; 20° C.]: | 6.7 |
| CC-5-V | 3.0% | HTP [1/μm; 20° C.]: | −11.37 |
| PCH-302 | 12.0% | Twist [°]: | 180 |
| CVCP-V-1 | 5.0% | V$_{10}$ [V]: | 2.17 |
| CVCP-V-01 | 5.0% | Steepness [%]: | 7.5 |
| CVCP-1V-01 | 5.0% | | |
| PGU-2-F | 6.0% | | |
| PGU-3-F | 6.0% | | |
| PGU-5-F | 6.0% | | |
| PTP-102 | 5.0% | | |
| PTP-201 | 5.0% | | |
| CPTP-301 | 5.0% | | |
| CPTP-302 | 4.0% | | |

EXAMPLE 3

| | | | |
|---|---|---|---|
| CGU-2-F | 8.0% | Clearing point [° C.]: | 102.0 |
| CGU-3-F | 8.0% | Δn [589 nm, 20° C.]: | 0.1429 |
| CCZU-2-F | 5.0% | HTP [1/μm; 20° C.]: | −12.07 |
| CCZU-3-F | 13.0% | Twist [°]: | 240 |
| CCZU-5-F | 5.0% | V$_{10}$ [V]: | 1.60 |
| CCP-3F.F.F | 8.0% | Steepness [%]: | 10.9 |
| CCP-V-1 | 14.0% | | |
| CVCP-V-01 | 5.0% | | |
| CVCP-1V-01 | 5.0% | | |
| PGU-3-F | 8.0% | | |
| PGU-5-F | 8.0% | | |
| PGU-2-F | 8.0% | | |
| PPTUI-3-2 | 5.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising one or more compounds of formula A

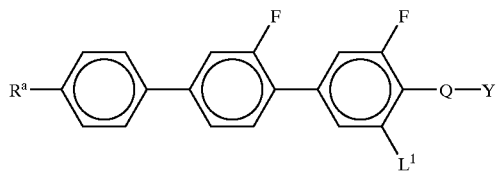

and at least one compound of formula B

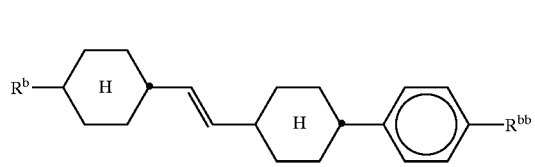

wherein $R^a$, $R^b$ and $R^{bb}$ are each, independently of one another, an alkyl radical of 1 to 12 C atoms which is unsubstituted, singly substituted by CN or $CF_3$ or at least singly substituted by halogen, wherein optionally one or more $CH_2$ groups in the radical is, in each case independently, replaced by —O—, —S—,

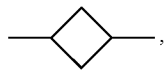

—CH=CH—, —C≡C—, —CO—, —CO—O—, —O—CO— or —O—CO—C— such that O atoms are not directly linked together, $L^1$ is H or F, Q is $CF_2$, $OCF_2$, CFH, OCFH or a single bond Y is F or Cl, and Q—Y together is optionally NCS, SCN, $OCHFCF_3$ or $SF_5$.

2. A liquid-crystalline medium according to claim 1, wherein said medium contains at least one compound of formula A-1 and/or A-2,

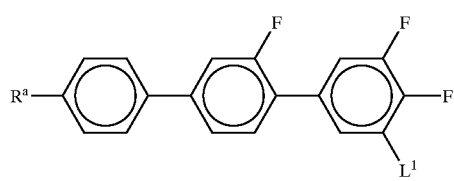

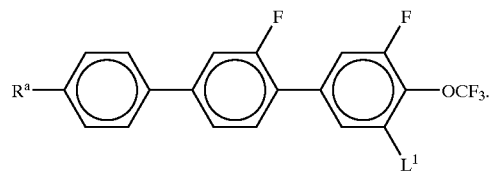

3. A liquid-crystalline medium according to claim 1, further comprising at least one compound of formulae IIa to IIk,

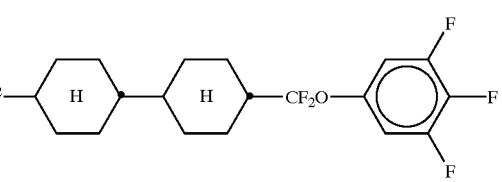

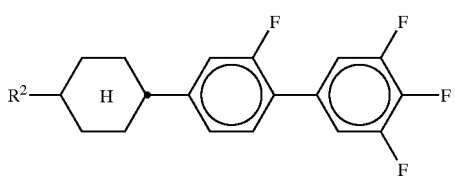

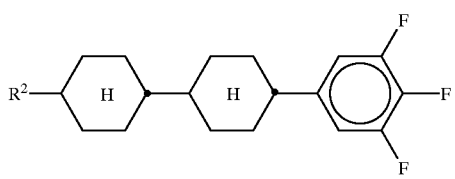

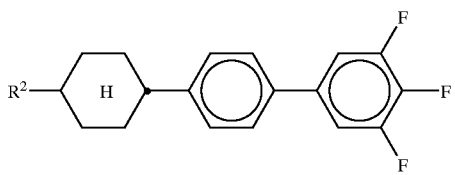

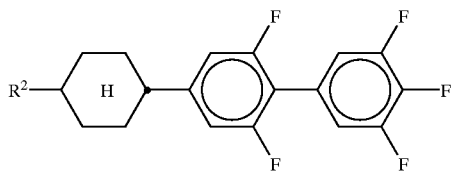

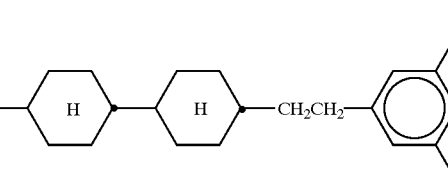

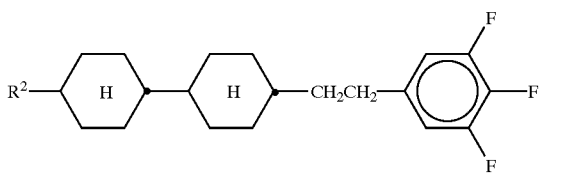

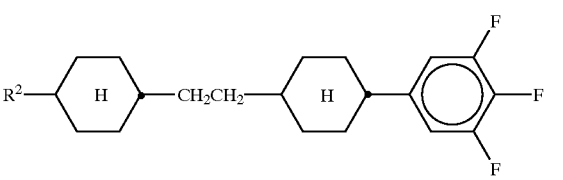

-continued

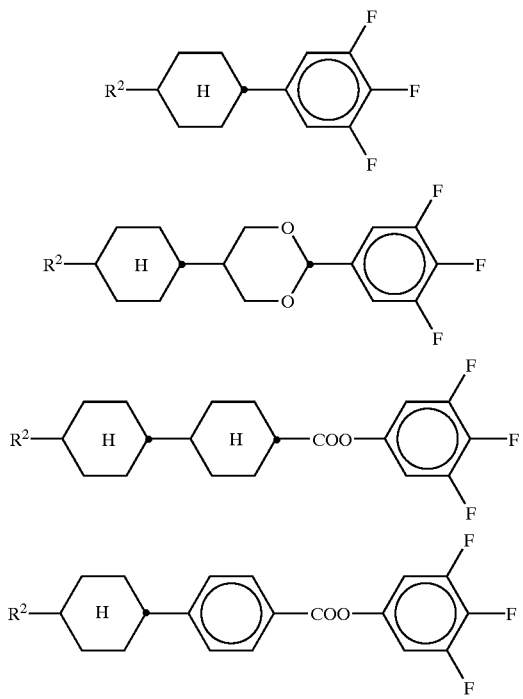

wherein $R^2$ is an alkyl radical of 1 to 12 C atoms which is unsubstituted, singly substituted by CN or $CF_3$ or at least singly substituted by halogen, wherein optionally one or more $CH_2$ groups in the radical, in each case independently, is replaced by —O—, —S—,

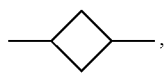

—CH=CH—, —C≡C—, —CO—, —CO—O—, —O—CO— or —O—CO—O— such that O atoms are not directly linked together.

4. A liquid-crystalline medium according to claim 1, further comprising one or more cyano compounds of the formulae IIIa to IIIj,

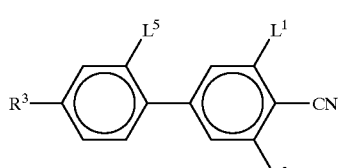

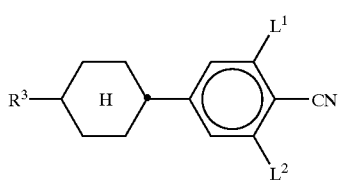

-continued

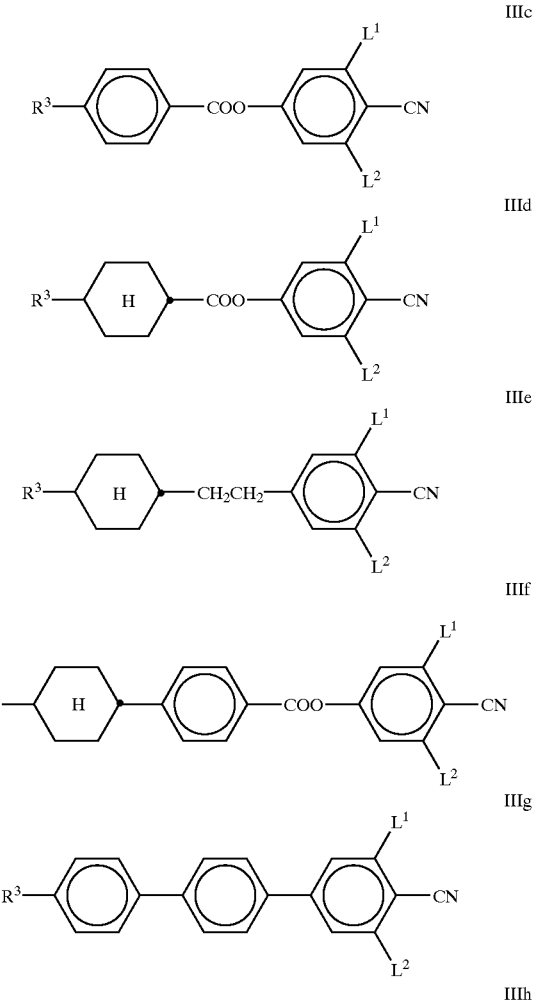

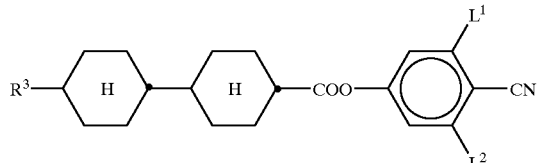

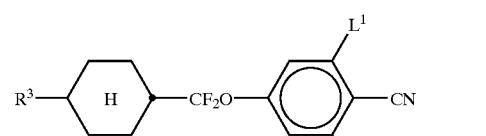

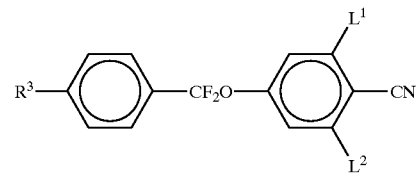

wherein $R^3$ is an alkyl radical of 1 to 12 C atoms which is unsubstituted, singly substituted CN or $CF_3$ or at least singly substituted by haogen, wherein optionally one or more CH$_2$ groups in the radical is, in each case indepently, replace by —O—, —S,

—CH=CH—, —C≡C—, —CO—, —CO—O, —O—CO— or —O—CO—O—such that O atoms are not directly linked together, and L$^1$, L$^2$ and L$^5$ are each, independently of one another, H or F.

5. A liquid-crystalline medium according to claim 1, further comprising one or more compounds of formula IV,

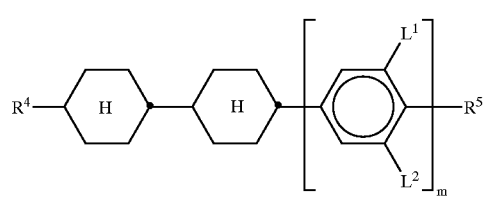

IV wherein
m is 0 or 1,
R$^4$ is an alkenyl group of 2 to 7 C atoms,
R$^5$ is an alkyl radical of 1 to 12 C atoms which is unsubstituted, singly substituted by CN or CF$^3$ or at least singly substituted by halogen, wherein optionally one or more CH$_2$ groups in the radical is, in each case independently, replaced by —O—, —S—,

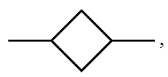

—CH=CH—, —C≡C—, —CO—, —CO—O—, —O—CO— or —O—CO—O— such that O atoms are not directly linked together, or if m=1, R$^5$ is optionally F, Cl, CF$_3$, or OCF$_3$, L$^1$ and L$^2$ each, independently of one another, is H or F.

6. A liquid-crystalline medium according to claim 1, further comprising one or more tolane compounds of the formulae T2a, T2b and/or T2c,

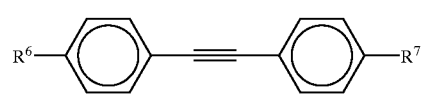
T2a

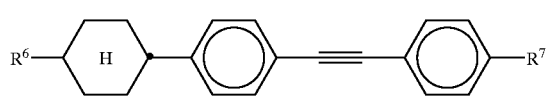
T2b

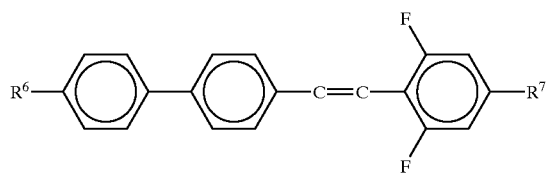
T2c wherein
R$^6$ and R$^7$ are an alkyl radical of 1 to 12 C atoms which is unsubstituted, singly substituted by CN or CF$_3$ or at least singly substituted by halogen, wherein optionally one or more CH$_2$ groups in the radical is, in each case independently, replaced by —O—, —S—,

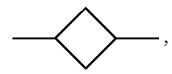

—CH=CH—, —C≡C—, —CO—, —CO—O—, —O—CO— or —O—CO—O— such that O atoms are not directly linked together.

7. A liquid-crystalline medium according to claim 1, comprising 5–30 wt % of compounds of formula A.

8. A liquid-crystalline medium according to claim 1, comprising 5–30 wt % of compounds of formula B.

9. A liquid-crystalline medium according to claim 1, comprising more than 20% of compounds having a dielectric anisotropy of Δε≧+12.

10. In an electro-optical liquid-crystal display comprising a liquid-crystalline medium, the improvement wherein said medium is in accordance with claim 1.

11. A liquid-crystalline medium according to claim 1, comprising at least three homologues of the compounds of formula A wherein R$^a$ is C$_2$H$_5$, n-C$_3$H or n-C$_5$H$_{11}$.

12. A liquid-crystalline medium according to claim 1, comprising a total of 3 to 6 compounds of formulae A and B, wherein the said compounds comprise 25–65 wt % of the liquid-crystalline medium.

13. A liquid-crystalline medium according to claim 1, further comprising 2–35 wt % of compounds of V$_a$ and/or V$_b$

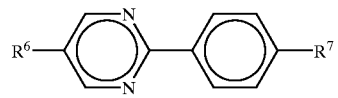
Va

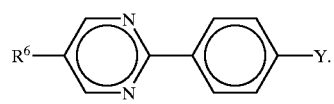
Vb wherein
R$^6$ and R$^7$ are an alkyl radical of 1 to 12 C atoms which is unsubstituted, singly substituted by CN or CF$^3$ or at least singly substituted by halogen, wherein optionally one or more CH$_2$ groups in the radical is, in each case independently, replaced by —O—, —S—,

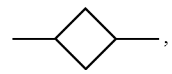

—CH=CH—, —C≡C—, —CO—, —CO—O—, —O—CO— or —O—CO—O— such that O atoms are not directly linked together, and Y is F or Cl.

14. A liquid-crystalline medium according to claim 6, wherein the tolane compounds comprise 2–20 wt % of the liquid-crystalline medium.

15. A liquid-crystalline medium according to claim 1, comprising 2–25 wt % of compounds of formula B-5a

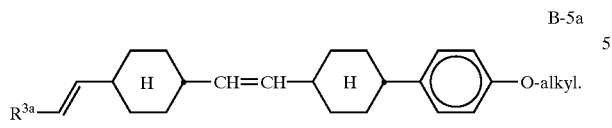

B-5a wherein $R^{3a}$ is H, $CH_3$, $C_2H_5$ or $n-C_3H_7$, and alkyl is an alkyl group having 1 to 7 C atoms.

16. A liquid-crystalline medium according to claim 1, comprising 10–25 wt % of compounds of formula A.

17. A liquid-crystalline medium according to claim 1, comprising 5–20 wt % of compounds of formula B.

18. A TN or STN liquid crystal display comprising two substrates which, together with an edging, form a cell, contained in the cell, a nematic liquid crystal mixture with positive dielectric anisotropy, electrode layers having alignment layers on the insides of the substrates, a pre-tilt angle between the longitudinal axis of the molecules at the surface of the substrates and the substrates of 0 to 30 degrees, a liquid crystal mixture in the cell with a twist angle from alignment layer to alignment layer of 22.5° to 600°, and a nematic liquid crystal mixture comprising
  a) 15–75 wt % of a liquid-crystalline component A, containing one or more compounds with a dielectric anisotropy of more than +1.5;
  b) 25–85 wt % of a liquid-crystalline component B, containing one or more compounds with a dielectric anisotropy of –1.5 to +1.5;
  c) 0–20 wt % of a liquid-crystalline component D, containing one or more compounds with a dielectric anisotropy of less than –1.5, and
  d) optionally an optically active component C in an amount that the ratio between layer thickness, spacing of the substrates, and natural pitch of the chiral nematic liquid crystal mixture is 0.2 to 1.3,
    wherein component A comprises at least one compound of formula A

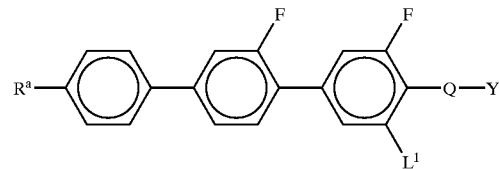

A and component B comprises at least one compound of formula B

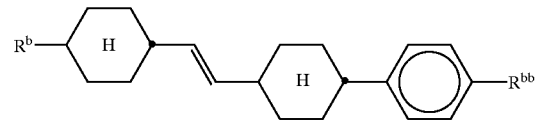

B wherein $R^a$, $R^b$ and $R^{bb}$ are each, independently of one another, an alkyl radical of 1 to 12 C atoms which is unsubstituted, singly substituted by CN or $CF_3$ or at least singly substituted by halogen, wherein optionally one or more $CH_2$ groups in the radical is, in each case independentlyl, replaced by —O—, —S—,

,

—CH=CH—, —C≡C—, —CO—, —CO—O—, —O—CO— or —O—CO—O— such that O atoms are not directly linked together, $L^1$ is H or F, Q is $CF_2$, $OCF_2$, OCFH or a single bond, Y is F or Cl, and Q—Y together is optionally NCS, SCN, $OCHFCF_3$ or $SF_5$.

19. A TN or STN liquid crystal display according to claim 18, comprising, independently of one another, 20–65 wt % of component A and 0–10 wt % of component C.

20. A TN or STN liquid crystal display according to claim 18, wherein the dielectric anisotropy of component A is more than 12.

* * * * *

UNITED STATES PATENT AND TRADEMARK OFFICE
CERTIFICATE OF CORRECTION

PATENT NO.   : 6,613,401 B2
DATED        : September 2, 2003
INVENTOR(S)  : Hirschmann et al.

It is certified that error appears in the above-identified patent and that said Letters Patent is hereby corrected as shown below:

Column 33,
Line 48, "—C—" should be -- —O— --.
Line 51, insert a comma after "bond".

Column 36,
Line 66, insert -- by -- after "substituted".

Column 37,
Line 2, "replace" should be -- replaced --.
Line 8, "—CO—O—" should be -- —CO—O— --.
Line 31, "CF³" should be -- $CF_3$ --.

Column 38,
Line 22, "$\Delta\varepsilon \geqq +12$" should be -- $\Delta\varepsilon \geq +12$ --.
Line 29, "n-$C_3$H" should be -- n-$C_3H_7$ --.
Line 45, delete the period at the end of the formula.
Line 51, "CF³" should be -- $CF_3$ --.

Column 39,
Line 6, delete the period at the end of the formula.

Column 40,
Line 27, "independentlyl" should be -- independently --.
Line 37, "$OCF_2$," should be -- CFH, --.

Signed and Sealed this

Twenty-ninth Day of March, 2005

JON W. DUDAS
*Director of the United States Patent and Trademark Office*